(12) United States Patent
Li

(10) Patent No.: US 7,589,960 B2
(45) Date of Patent: Sep. 15, 2009

(54) DISK DRIVE ASSEMBLY

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 42 days.

(21) Appl. No.: 11/847,356

(22) Filed: Aug. 30, 2007

(65) Prior Publication Data

US 2009/0034185 A1   Feb. 5, 2009

(30) Foreign Application Priority Data

Jul. 31, 2007   (CN) .................. 2007 2 0200752 U

(51) Int. Cl.
*H05K 7/10* (2006.01)
(52) U.S. Cl. .................. 361/679.33; 211/26; 312/319.1
(58) Field of Classification Search .................. 211/26; 312/223.1, 319.1; 361/679–687, 724–727
See application file for complete search history.

(56) References Cited

U.S. PATENT DOCUMENTS

| | | | | |
|---|---|---|---|---|
| 7,206,200 | B2 * | 4/2007 | Chung | 361/685 |
| 2007/0268662 | A1 * | 11/2007 | Zhang et al. | 361/685 |
| 2008/0067908 | A1 * | 3/2008 | Yuh | 312/319.1 |
| 2008/0137280 | A1 * | 6/2008 | Chen et al. | 361/685 |

* cited by examiner

*Primary Examiner*—Hung V Duong
(74) *Attorney, Agent, or Firm*—Frank R. Niranjan

(57) ABSTRACT

A disk drive assembly for a server system includes a drive bracket (30), a disk drive (10), and a backboard (50). The drive bracket includes a top wall (31) and two parallel sidewalls (34) perpendicular to the top wall. The disk drive is received in the drive bracket between the two sidewalls. The disk drive has a port (15) defined therein. The backboard is secured to the drive bracket and perpendicular to the top wall and the sidewalls thereof. The backboard includes a main body (51) and a connecting member (53) detachably mounted on the main body. The connecting member is connected to the port of the disk drive and facilitates communication between the disk drive and the server system.

18 Claims, 4 Drawing Sheets

DISK DRIVE ASSEMBLY

BACKGROUND

1. Field of the Invention

The present invention relates to disk drive assemblies, and more particularly to a disk drive assembly with a backboard.

2. Description of Related Art

Generally, a plurality of disk drives is installed in a server system. The disk drives are usually mounted in a drive bracket, and then mounted in the server system. A backboard with an indicator light thereon is commonly secured to the rear of the drive bracket. The disk drives electrically connect with the backboard when installed into the drive bracket. Thereby, the disk drives connect with the server system via the backboard. The working states of the disk drives can be displayed by the indicator light of the backboard. However, the conventional backboard includes many complicated circuits thereon.

What is needed, therefore, is a disk drive assembly with a simply structured backboard without all the complicated circuits.

SUMMARY

A disk drive assembly for a server system includes a drive bracket, a disk drive, and a backboard. The drive bracket includes a top wall and two parallel sidewalls perpendicular to the top wall. The disk drive is received in the drive bracket between the two sidewalls. The disk drive has a port defined therein. The backboard is secured to the drive bracket and perpendicular to the top wall and the sidewalls thereof. The backboard includes a main body and a connecting member detachably mounted on the main body. The connecting member is connected to the port of the disk drive and facilitates communication between the disk drive and the server system.

Other advantages and novel features of the present invention will become more apparent from the following detailed description of a preferred embodiment when taken in conjunction with the accompanying drawings, in which:

DETAILED DESCRIPTION

Figure 1:
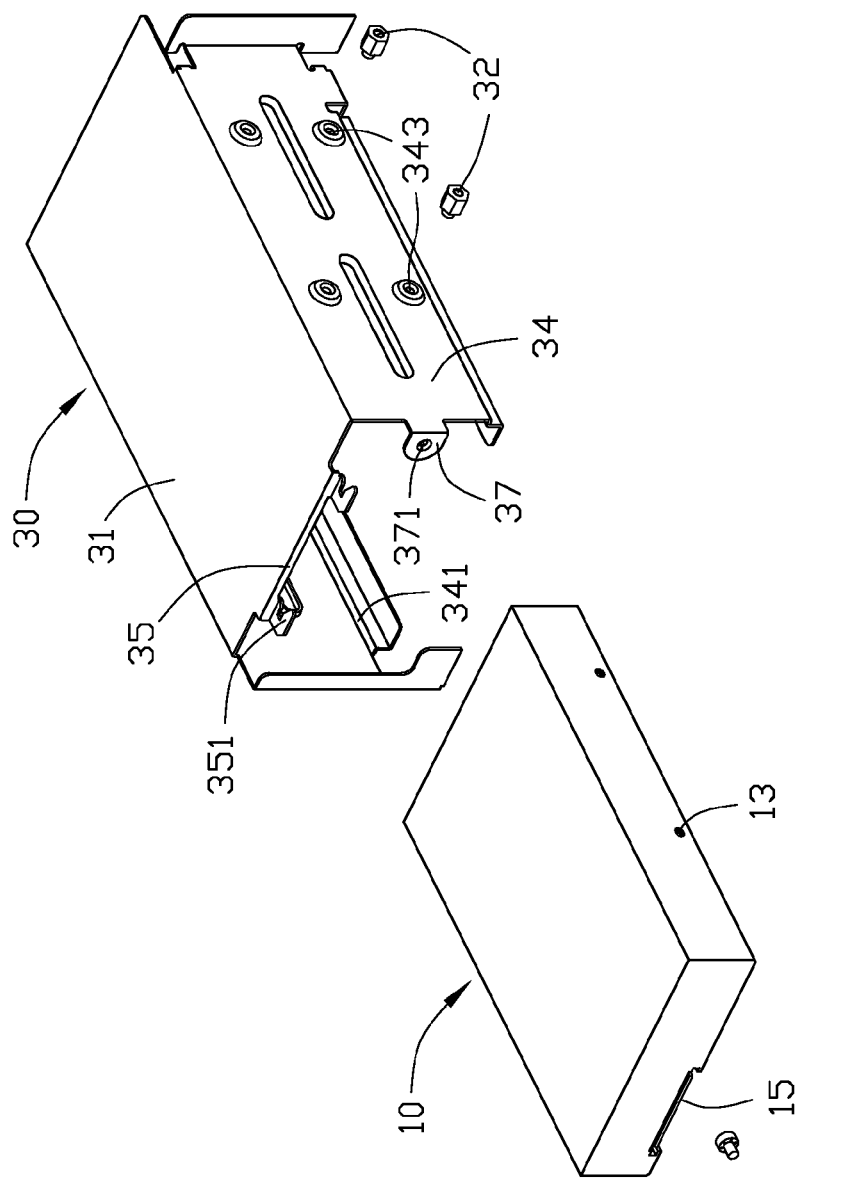
FIG. 1 is an exploded, isometric view of a disk drive assembly with a backboard in accordance with an embodiment of the present invention.

Referring to FIG. 1, a disk drive assembly of an embodiment of the present invention includes a drive bracket 30, a disk drive 10 received in the drive bracket 30 and a backboard 50 secured to the drive bracket 30. The disk drive 10 includes a port 15 at a bottom edge thereof for transmitting data, and two screw holes 13 defined in one side adjacent to the port 15.

The drive bracket 30 includes a top wall 31, and a pair of sidewalls 34 extending perpendicularly from two opposite edges of the top wall 31. A bent portion 35 extends downwardly from one of the other two opposite edges of the top wall 31. Two L-shaped hooks 351 are respectively formed at ends of a bottom edge of the bent portion 35, and extend along a same direction towards one of the two sidewalls 34. A supporting portion 341 extends in from a bottom edge of each sidewall 34, for supporting the disk drive 10. One of the two sidewalls 34 defines two mounting holes 343 thereon, corresponding to the two screw holes 13 of the disk drive 10 respectively. The disk drive 10 can be mounted in the drive bracket 30 when two screws 32 are respectively screwed to the corresponding screw holes 13 of the disk drive 10 via the corresponding mounting holes 343 of the drive bracket 30. A fixing clip 37 is perpendicularly bent in from an edge of one sidewall 34. The fixing clip 37 defines a fixing hole 371 therein.

Figure 2:
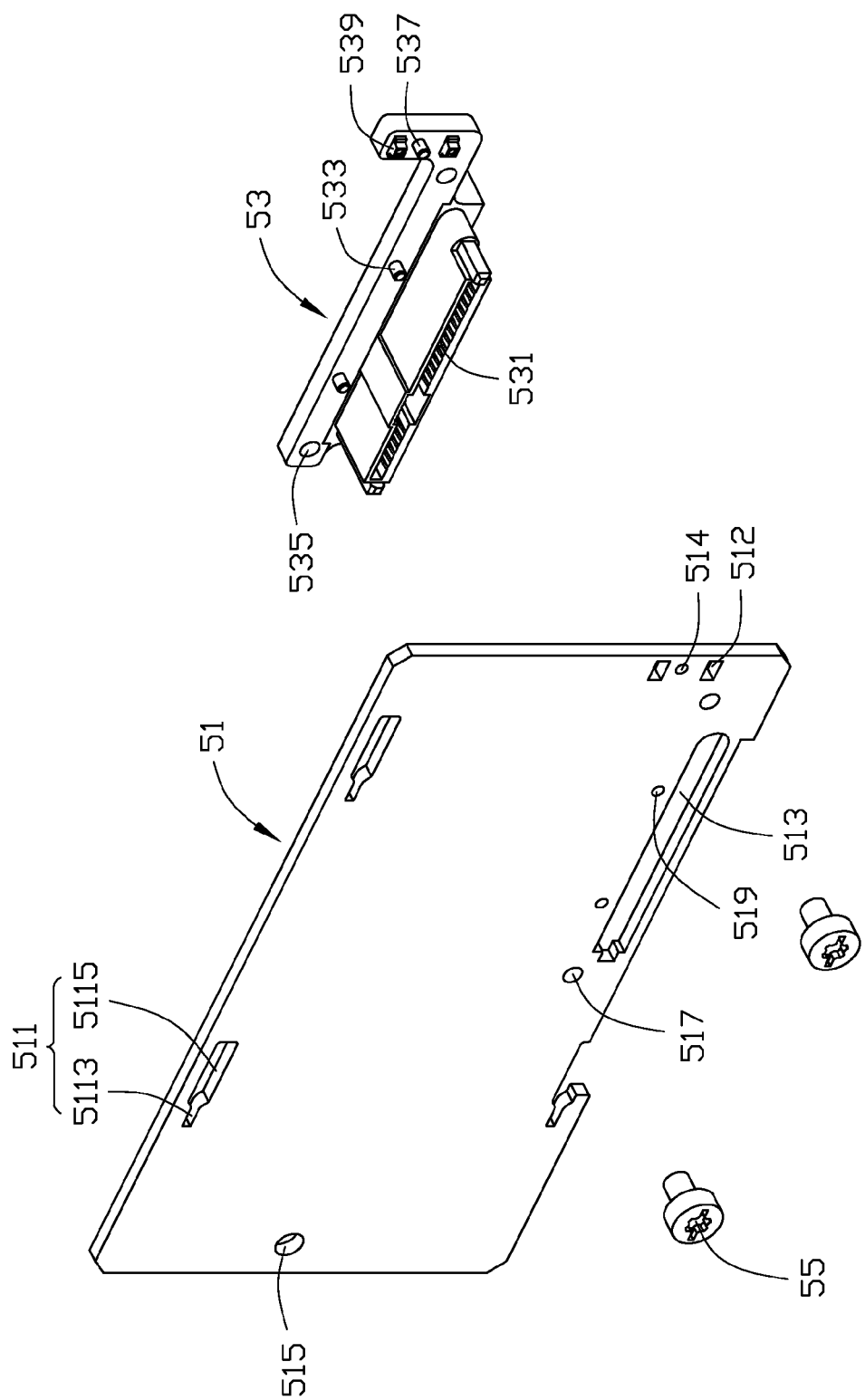
FIG. 2 is an exploded, isometric view of the backboard of FIG. 1.

Referring also to FIG. 2, an exploded, isometric view of the backboard 50 is shown. The backboard 50 includes a rectangular main body 51, an L-shaped connecting member 53 installed on the main body 51, and two fasteners 55 for screwing the connecting member 53 to the main body 51. The main body 51 has two locking slots 511 defined therein adjacent a top edge thereof, corresponding to the two hooks 351 of the drive bracket 30. Each locking slot 511 includes a wide portion 5115 and a narrow portion 5113. A receiving slot 513 is defined on a bottom edge of the main body 51 for receiving the connecting member 53, corresponding to the port 15 of the disk drive 10. Two openings 517 are respectively defined on opposite sides of the receiving slot 513, for mounting the connecting member 53. A securing hole 514 is defined on the main body 51 adjacent one of the two openings 517, and two rectangular retaining openings 512 are respectively formed on the up and down sides of the securing hole 514. Two alignment holes 519 are defined in the main body 51 adjacent a topside of the receiving slot 513. A fastening hole 515 is defined at one side of the main body 51 opposite to the securing hole 514. The connecting member 53 has a first connector 531 formed on one side thereof for inserting into the port 15 of the disk drive 10, and a second connector 532 connected to a cable for communicating with a server system. The disk drive 10 can be connected to the server system when the first connector 531 of the connecting member 53 is inserted into the port 15 of the disk drive 10 via the receiving slot 513 of the main body 51. Two posts 533 protrude from the connecting member 53 on top of the first connector 531, corresponding to the alignment holes 519 of the main body 51. Two threaded holes 535 are respectively defined on opposite sides of the connecting member 53, corresponding to the openings 517 of the main body 51. Two indicator devices 539 are disposed on one side of the connecting member 53 adjacent one of the two threaded holes 535 for indicating the working state of the disk drive 10, and a positioning pin 537 protrudes between the two indicator devices 539, for inserting into the securing hole 514.

Figure 3:
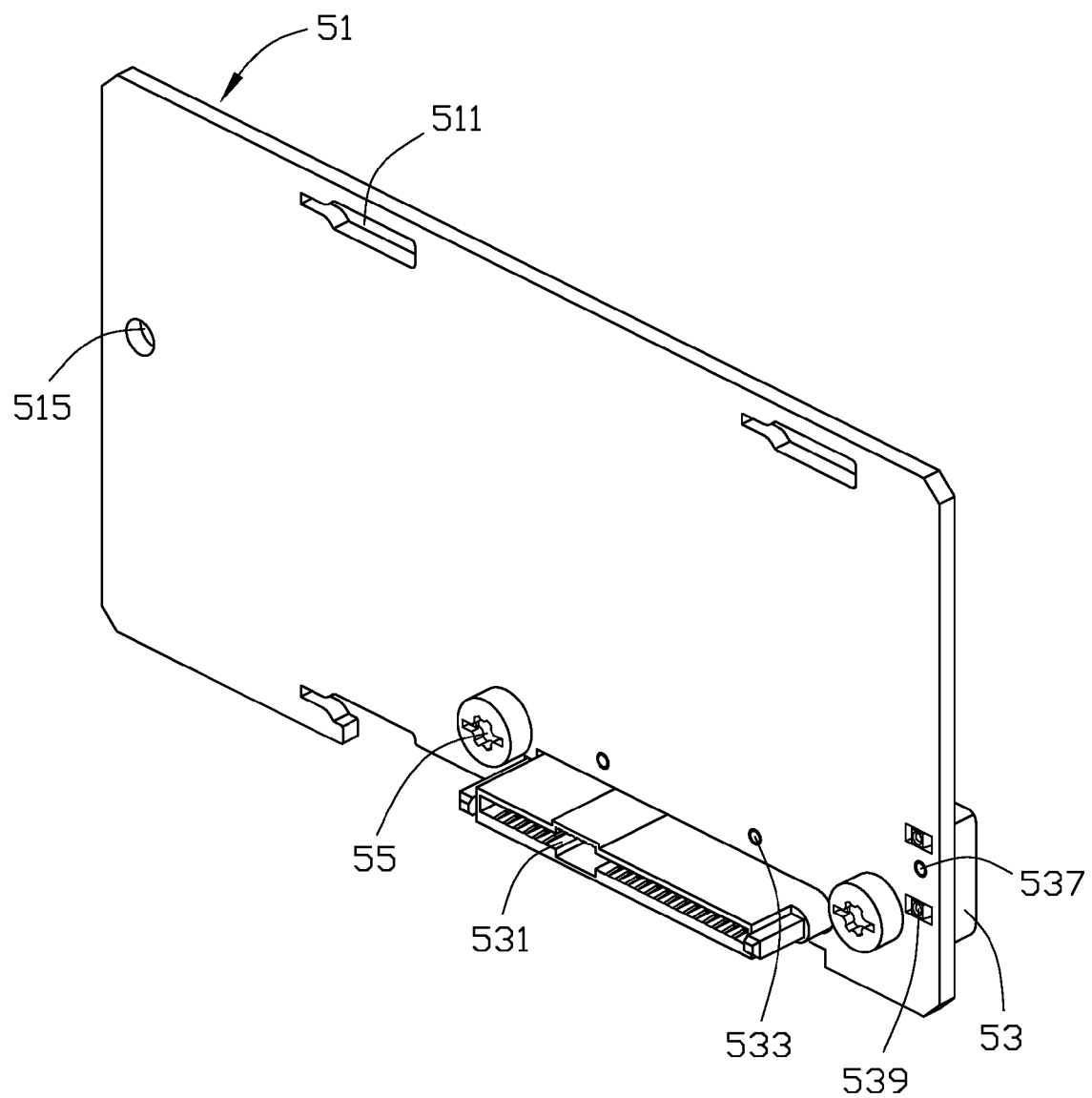
FIG. 3 is an assembled view of the backboard of FIG. 1.

Referring also to FIG. 3, in assembly of the backboard 50, the connecting member 53 is installed on the main body 51, along a direction perpendicular to the main body 51. The receiving slot 513 receives the first connector 531 of the connecting member 53. The posts 533 and the positioning pin 537 of the connecting member 53 are respectively received in the alignment holes 519 and the securing hole 514 of the main body 51. The retaining openings 512 receive the indicator devices 539 of the connecting member 53. The fasteners 55 are screwed into the corresponding threaded holes 535 of the connecting member 53 through the corresponding openings 517 of the main body 51, thereby the connecting member 53 being secured to the main body 51 of the backboard 50.

Figure 4:
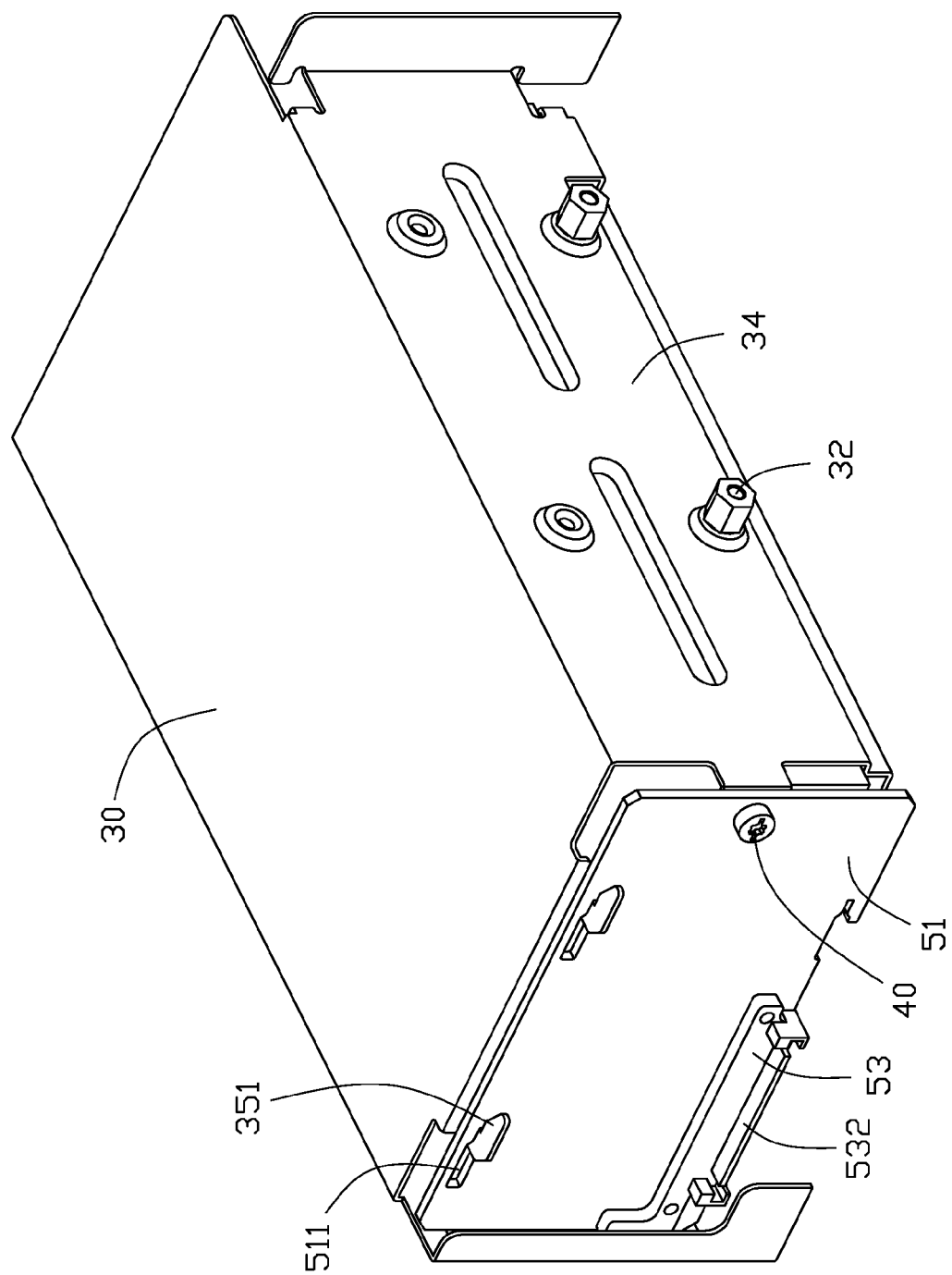
FIG. 4 is an assembled view of the disk drive assembly with the backboard of FIG. 1.

Referring to FIG. 4, in assembly of the disk drive assembly with the backboard 50, the disk drive 10 is located on the supporting portions 341 of the drive bracket 30. The screws 32 are screwed into the corresponding screw holes 13 of the disk drive 10 through the corresponding mounting holes 343 of the drive bracket 30, thereby fixing the disk drive 10 in the drive bracket 30. Then the backboard 50 is moved towards the drive bracket 30, the hooks 351 of the drive bracket 30 are inserted into the locking slots 511 of the backboard 50 through the wide portions 5115. The backboard 50 is pushed towards the other sidewall 34 of the two sidewalls 34 along the edges of the top wall 31 and the two sidewalls 34 until the hooks 351 are slid into the narrow portions 5113 of the locking slots 511, and abut against an outer surface of the backboard 50, thereby preventing the backboard 50 moving along a direction perpendicular to the backboard 50. At the same time, the first connector 531 of the backboard 50 is inserted into the port 15 of the disk drive 10. A fastener 40 is screwed into the fixing hole 371 of the drive bracket 30 through the fastening hole 515 of the main body 51, thereby fixing the backboard 50 on the drive bracket 30.

For the server system to receive many disk drives 10, all that is needed is a corresponding number of receiving slots 513, openings 517, alignment holes 519, securing holes 514 and retaining openings 512 for fixing many connecting members 53 defined in the main body 51 of the backboard 50. Thereby, a simply structured low-cost backboard 50 is achieved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk drive assembly for a server system comprising:
a drive bracket comprising a top wall and two parallel sidewalls perpendicular to the top wall;
a disk drive received in the drive bracket between the two sidewalls, the disk drive having a port defined therein; and
a backboard secured to the drive bracket and perpendicular to the top wall and the sidewalls thereof, the backboard comprising a main body and a connecting member detachably mounted on the main body, the connecting member connected to the port of the disk drive and facilitating communication between the disk drive and the server system.

2. The disk drive assembly as described in claim 1, wherein the main body defines a receiving slot therein, the connecting member comprises a first connector extending through the receiving slot and inserting into the port of the disk drive, and a second connector for connection to the server system.

3. The disk drive assembly as described in claim 2, wherein the first connector is exposed on one side of the main body, the second connector is located on an opposite side of the main body to the first connector.

4. The disk drive assembly as described in claim 2, wherein the connecting member comprises two posts disposed above the first connector, the main body defines two alignment holes engaging with the corresponding posts.

5. The disk drive assembly as described in claim 2, wherein two threaded holes are respectively formed on the opposite sides of the first connector of the connecting member, two openings are respectively defined in the main body corresponding to the threaded holes, two fasteners engage in the threaded holes of the connecting member through the openings, for preventing the connecting member releasing from the main body.

6. The disk drive assembly as described in claim 1, wherein at least an indicator device is disposed on the connecting member, the main body defines a retaining opening receiving the indicator device.

7. The disk drive assembly as described in claim 1, wherein two spaced hooks are formed on the edge of the top wall, the backboard has two locking slots engagingly receiving the hooks.

8. The disk drive assembly as described in claim 1, wherein a fixing clip is perpendicularly bent from one of two sidewalls of the drive bracket, and defines a fixing hole therein, the main body of the backboard defines a fastening hole corresponding to the fixing hole, a fastener is screwed to the fixing hole of the fixing clip through the fastening hole.

9. The disk drive assembly as described in claim 1, wherein a supporting portion extends from a bottom edge of each sidewall for carrying the disk drive, the disk drive defines at least a screw hole in one side thereof, one of the sidewalls of the drive bracket defines at least a mounting hole corresponding to the screw hole, a fastener is screwed into the screw hole through the mounting hole.

10. A disk drive assembly for a server system comprising:
a drive bracket;
a disk drive received in the drive bracket, the disk drive having a port; and
a backboard mounted to the disk drive, the backboard comprising a connecting member connected to the port of the disk drive for facilitating communication between the disk drive and the server system, the connecting member having at least an indicator device disposed thereon for indicating the working state of the disk drive.

11. The disk drive assembly as claimed in claim 10, wherein the backboard further comprises a main body defining a receiving slot therein, the connecting member being mounted on the main body, and having a connector being received in the receiving slot and inserted into the port of the disk drive.

12. The disk drive assembly as claimed in claim 11, wherein the connecting member comprises two posts disposed above the connector, the main body defines two alignment holes engaging with the corresponding posts.

13. The disk drive assembly as claimed in claim 11, wherein a threaded hole is formed in the side of the connector of the connecting member, an opening is defined in the main body corresponding to the threaded hole, a fastener engages in the threaded hole of the connecting member through the opening, for preventing the connecting member releasing from the main body.

14. The disk drive assembly as claimed in claim 13, wherein the indicator device is disposed on the connecting member adjacent the threaded hole, the main body defines a retaining opening corresponding to the indicator device receiving the indicator device therein.

15. The disk drive assembly as claimed in claim 14, wherein a positioning pin protrudes from the connecting member adjacent to the indicator device, the main body forms a securing hole for receiving the positioning pin therein.

16. The disk drive assembly as claimed in claim 10, wherein the drive bracket comprises a top wall and two parallel sidewalls, two spaced books are formed on one edge of the top wall, the backboard has two locking slots defined in a top side of the main body for receiving the hooks.

17. The disk drive assembly as claimed in claim 16, wherein a fixing clip is perpendicularly bent from one of two sidewalls of the drive bracket, and defines a fixing hole therein, the main body of the backboard defines a fastening hole corresponding to the fixing hole, a fastener is screwed to the fixing hole of the fixing clip through the fastening hole.

18. A disk drive bracket assembly for receiving a disk drive therein, the disk drive having a disk drive connector, comprising:
- a drive bracket comprising a top wall and opposite sidewalls depending from the top wall; and
- a backboard detachably coupled to the drive bracket, the backboard having a plate perpendicular to the top wall and the sidewalls thereof, and a first and a second connector mounted on opposite sides of the plate, the first connector being configured for connection to the disk drive connector of the disk drive.

* * * * *